(12) United States Patent
Snider

(10) Patent No.: US 6,544,806 B1
(45) Date of Patent: Apr. 8, 2003

(54) FAST COMPUTATION OF TRUTH TABLES

(75) Inventor: Gregory Stuart Snider, Mountain View, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 29 days.

(21) Appl. No.: 09/872,809

(22) Filed: May 31, 2001

(51) Int. Cl.$^7$ ................................ H01L 21/66

(52) U.S. Cl. ............................. 438/17; 716/1

(58) Field of Search .............. 716/1, 4, 5, 17; 438/17, 18

(56) References Cited

U.S. PATENT DOCUMENTS 4,377,849 A * 3/1983 Finger et al. ................ 364/491
6,138,266 A * 10/2000 Ganesan et al. ............... 716/5

* cited by examiner

*Primary Examiner*—David Nelms
*Assistant Examiner*—Quoc Hoang

(57) ABSTRACT

A method for computation of truth tables is provided in which computing a truth table with N input variables includes the steps of: (a) providing N basis tables; (b) associating each one of the N basis tables with a corresponding one of the N input variables; and (c) performing logic operations on the N basis tables using a processor. Logic operations are performed on each bit of the each of the basis tables simultaneously.

16 Claims, 2 Drawing Sheets

FAST COMPUTATION OF TRUTH TABLES

TECHNICAL FIELD

The present invention relates generally to programmable logic devices, and more particularly to computation of truth tables in programmable logic devices.

BACKGROUND ART

Combinational logic functions are basic building blocks of digital electronic circuits. As is well known, any combinational function can be specified as a Boolean logic function of its inputs, and this function can be implemented in a logic circuit. By expressing Boolean logic functions in sum of products (SOP) or product of sums (POS) form, it becomes a straightforward task to implement them with two-stage logic circuits (e.g., AND-OR, NAND-NAND, or NOR-NOR circuits). These two-stage circuits can be classified as product-term or Pterm-based circuits and can be implemented directly by electrically connecting those logic gates that are required to produce a desired function.

Programmable logic arrays (PLAs) are integrated circuits that can include multiple general-purpose product-term cells, which a designer can configure to implement specific combinational logic circuits. PLAs can be mask-based arrays that are permanently configured during semiconductor processing to form application-specific integrated circuits (ASICs). Alternatively, they can be field-programmable, which means that they can be electrically programmed, and reprogrammed with relative ease away from a manufacturing plant. These field-programmable logic devices are known as field programmable gate arrays (FPGAs).

FPGAs are revolutionizing the way digital electronics system designers implement logic. By radically reducing the development costs and the turnaround time for implementing thousands of gates of logic, FPGAs provide new capabilities that affect the semiconductor industry. FPGAs are changing the way digital systems will be designed in the future.

A FPGA typically includes an array of programmable logic blocks that can be programmably interconnected to each other to provide the logic function desired by the digital electronics designer. Each of the programmable logic blocks may be individually programmed to perform any one of a number of different logic functions. The FPGA has configurable routing matrices for coupling the programmable logic blocks together according to a desired configuration. The FPGA also includes configuration memory cells. The configuration memory cells are coupled to the programmable logic blocks for specifying the function performed by each programmable logic block, and to the configurable routing matrices for specifying the coupling of the inputs and the outputs of the programmable logic blocks. Each programmable logic block is coupled to several configuration memory cells. Each configuration routing matrix is coupled to several configuration memory cells. By storing different values in the configuration memory cells, each programmable logic block may be individually programmed as to its function and coupling.

Each programmable logic block and configurable routing matrix includes a plurality of programmable switch elements. The settings of the programmable switch elements define the logic function comprised within each programmable logic block and the coupling of the inputs and the outputs of the programmable logic blocks. The settings of the programmable switch elements are determined by the information stored within the configuration memory cells. Presently, each configuration memory cell corresponds to a particular programmable switch element. To modify the setting of a programmable switch element and thereby modify the logic defined by a logic block, the information within the configuration memory cells must be modified.

FPGAs have several significant advantages over hardware designed for a single specific purpose integrated circuit, such as ASICs. First, FPGAs offer a faster time-to-market. In contrast, ASICs require considerable time for development, testing and prototyping, which potentially delaying of products incorporating them.

Second, FPGAs involve less non-recurring engineering costs. In contrast, ASICs require significant expenses in both design expertise as well as mask design, fabrication costs, etc., that must be amortized over the life of a product.

Third, FPGAs offer flexibility as it can be easily upgraded in the field. On the other hand, an ASIC cannot be cheaply upgraded in the field to correct design defects or to add features.

Fourth, FPGAs provide economy of scale since one FPGA can implement the functionality of many ASICs, thus spreading non-recurring development costs over a larger number of products.

A truth table is often used in digital logic systems to implement a logical function consisting of several inputs signals and one output signal. These truth tables are particularly important in programmable logic devices such as FPGAs where the desired behavior of a hardware circuit is not known at the time the hardware is designed, but instead is configured by the user. FPGAs are becoming increasingly popular as their capacities, i.e., the number of programmable truth tables, increases and their costs decrease.

Since FPGAs contain a large number of truth tables (more than 50,000 at present), it becomes important to be able to map logic equations into truth tables efficiently, especially in runtime reconfigurable systems that use them for accelerating computation, as is done in Firefly or BRASS. In the case of BRASS, it splits an application into multiple pieces, some of which are intended to be executed on a conventional sequential processor and others that are to be executed in reconfigurable hardware. The conventional processor and the reconfigurable hardware work together to implement the entire application, with various pieces of the application mapped to the reconfigurable hardware at the appropriate times. If this is done carefully, the application will run faster than it would if it had been executed solely on the sequential processor.

In the past, the most common way of computing truth tables was to construct and interconnect software data structures representing the logic circuit to be mapped to a truth table, and then to use the data structures to evaluate the output of the logic circuit for all possible combinations of inputs. For example, a truth table with N inputs will have $2^N$ bits. Therefore, $2^N$ evaluations are required since one evaluation is required for each bit in the truth table.

One problem associated with the prior art method of computing truth tables was that it was complicated and costly to construct and interconnect software data structures to represent the desired logic circuit. The problem worsened when the number of input increased. Another problem associated with the prior art method of computing truth tables was that was slow and time-consuming because each bit had to be evaluated sequentially. As the number of bits increased due to the increase in the number of inputs, so the time it took to evaluate them increased.

There has long been a need therefore, for an improved method for computation of truth tables that is fast, simple and inexpensive.

DISCLOSURE OF THE INVENTION

The present invention provides a method of computing a truth table with N input variables. The method includes: (a) providing N basis tables; (b) associating each one of the N basis tables with a corresponding one of the N input variables; and (c) performing logic operations on the N basis tables using a processor. This provides a method for computation of truth tables that is fast, simple and inexpensive.

The present invention further provides a method for fast computation of truth tables with N input variables. The method includes: (a) providing basis tables having $2^N$ bits; and (b) performing logic operations on each bit of each of the basis tables simultaneously. This provides a method for computation of truth tables that is fast, simple and inexpensive.

Furthermore, the method for computation of truth tables according to the present invention is simple and inexpensive because it eliminates the need for allocating and interconnecting data structures to represent a desired logic circuit, which is required in the conventional method.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
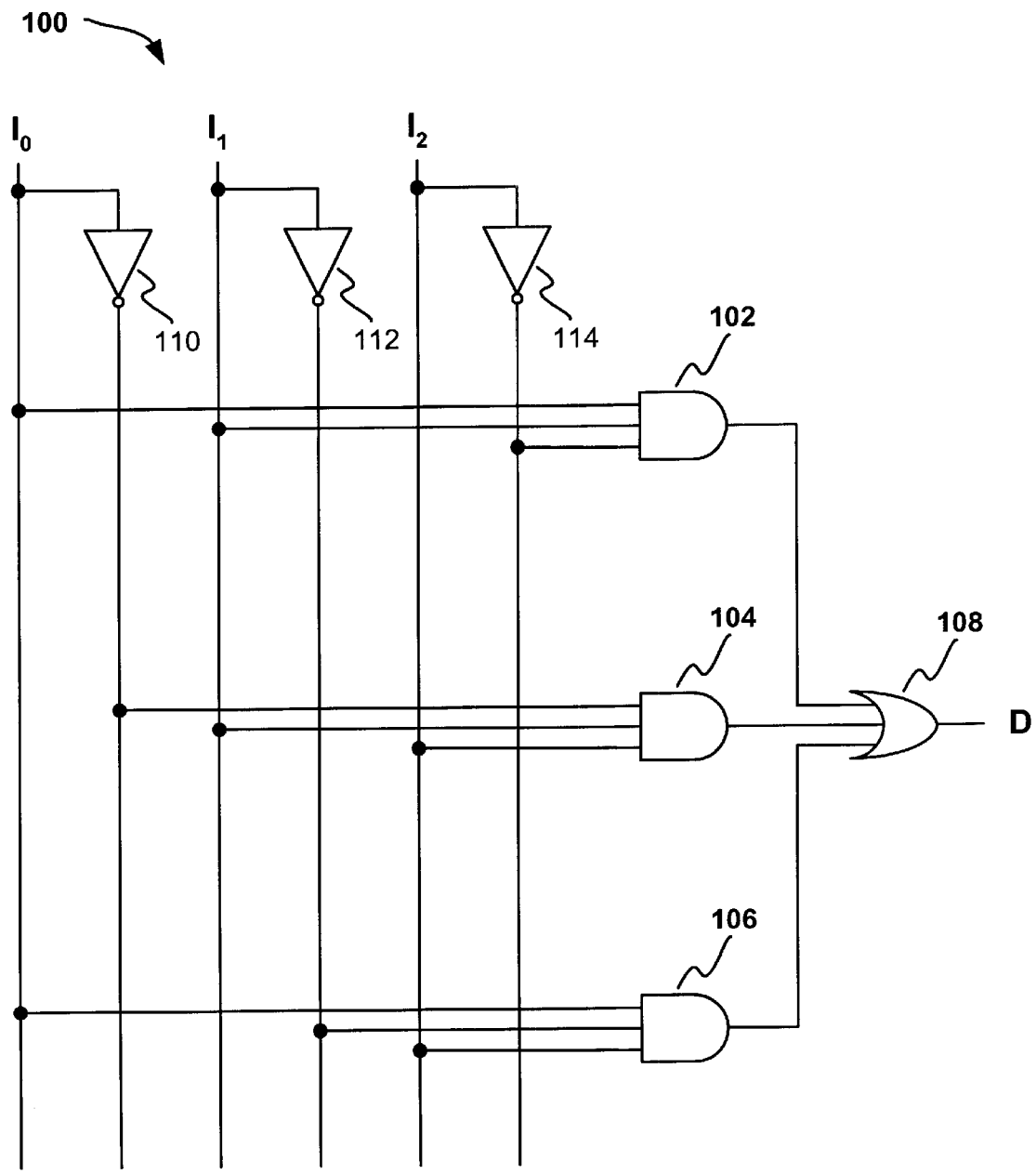
FIG. 1 is a schematic of a logic circuit for a "2 of 3 recognizer" circuit which is to be mapped to a truth table.

Referring now to FIG. 1, therein is shown a logic circuit 100 which represents a "2 of 3 recognizer" circuit. The logic circuit 100 includes three AND gates 102, 104, and 106, an OR gate 108, and three inverters 110, 112, and 114. Inputs to the logic circuit 100 are represented by $I_0$, $I_1$, and $I_2$, whereas D represents the output from the logic circuit 100.

The output D will be at logic 1 when exactly two of the three inputs ($I_0$, $I_1$, and $I_2$) are at logic 1, and can be described by the following equation:

$$D = (I_0 \& I_1 \& \sim I_2) | (\sim I_0 \& I_1 \& I_2) | (I_0 \& \sim I_1 \& I_2) \quad (1)$$

where

"&" represents logical AND,

"|" represents logical OR,

"~" in front of a variable represents a logical "NOT".

Evaluating or simulating the logic circuit 100 in software will require the allocation and interconnection of data structures for the AND gates 102, 104, and 106, the OR gate 108, and the inverters 110, 112, and 114, and the evaluation of all possible input combinations of $I_0$, $I_1$, and $I_2$. Since there are three inputs ($I_0$, $I_1$, and $I_2$), there are $2^3$ or 8 possible combinations, which requires 8 different evaluations. Pseudo code for an algorithm to simulate the logic circuit 100 could be as follows:

allocate structures for gates interconnect structures for (bit=0 to $2^N$-1){
   $I_0$=bit modulo 2
   $I_1$=(bit/2) modulo 2
   $I_2$=(bit/4) modulo 2
   Compute D[bit] by simulating circuit
}

The result is a truth table as set forth in Table 1, which is functionally equivalent to the logical circuit 100.

TABLE 1

| $I_2$ | $I_1$ | $I_0$ | D |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 0 |

This becomes increasingly slow and expensive as the number of inputs is increased. A logic circuit with N inputs requires $2^N$ evaluations since one evaluation is required for each bit in the table. Furthermore, each evaluation has to be done sequentially. It is believed that this method is being used in the commercial JBits system offered by the Xilinx Corporation for programming Xilinx FPGAs. For example, the documentation for Xilirix' "Expr" class (which is the Xilinx truth table generator) warns:

" . . . it is likely to be somewhat slow . . . generating lookup tables (LUTS) in general requires one evaluation per bit [of the truth table]" [deletions and insertion for clarity]

The present invention provides an easily implementable software solution to the problem of truth table generation and is faster and simpler than the conventional methods.

For example, the following is an evaluation of Truth Tables with N inputs in accordance with the present invention, where $2^N$ is less than or equal to the natural word width of a processor on which the algorithm is implemented.

In this situation, a 64-bit processor could be used to evaluate truth tables with up to 6 inputs, since $2^N$ is less than or equal to the 64 for N from 1 to 6.

A truth table with N inputs (and therefore $2^N$ bits) can be represented as a logical combination of exactly N basis truth tables. This is analogous to a vector space in mathematics where any vector in N-space can be represented as a linear combination of exactly N basis vectors.

Figure 2:
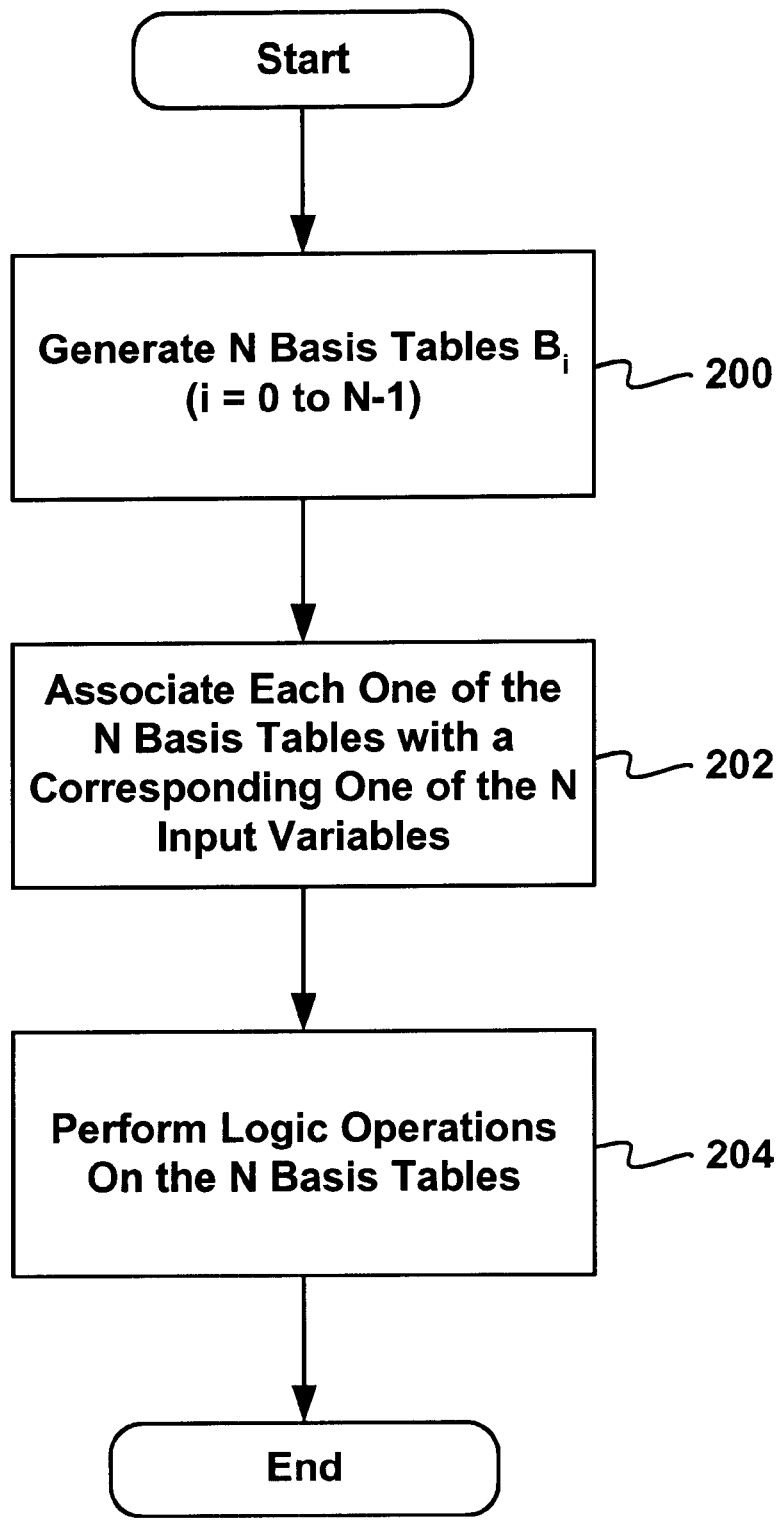
FIG. 2 is flow diagram which illustrates the method of computation of truth table in accordance with the present invention.

Referring now to FIG. 2, therein is shown a flow diagram of a method to compute truth tables in accordance with the present invention.

In one embodiment, the method begins with step 200 in which N basis tables $B_i$ (i=0 to 2) for a truth table with N inputs (where N=3) are generated. The basis tables are shown in Table 2 below.

TABLE 2

| $B_i$ | $B_{i0}$ | $B_{i1}$ | $B_{i2}$ | $B_{i3}$ | $B_{i4}$ | $B_{i5}$ | $B_{i6}$ | $B_{i7}$ |
|---|---|---|---|---|---|---|---|---|
| $B_0$ | 1 | 0 | 1 | 0 | 1 | 0 | 1 | 0 |
| $B_1$ | 1 | 1 | 0 | 0 | 1 | 1 | 0 | 0 |
| $B_2$ | 1 | 1 | 1 | 1 | 0 | 0 | 0 | 0 | where $B_{i0}$ is the Most Significant Bit (MSB), and $B_{i7}$ is the Least Significant Bit (LSB).

The basis tables $B_0$, $B_1$, and $B_2$ can be computed from the following equation:

$$B_{ib} = \lfloor b/2^i \rfloor \text{ modulo } 2 \quad (2)$$

where $\lfloor \; \rfloor$ is a "floor" function which rounds down its content to the nearest integer, for example, the content of $\lfloor \; \rfloor$ in equation (2) is $b/2^i$;

i is the index of the basis table, i=0 to N−1; and b is the bit number in the table, b=0 to $2^N-1$ Each basis table is represented by a single word of a memory coupled to the processor.

At step 202, the basis tables $B_0$, $B_1$, and $B_2$ are associated with inputs of the desired function to be mapped, with one basis table associated with each input variable.

In the case of a "2 of 3 recognizer", the basis tables are mapped to the input variables as follows:

$$I_0 \rightarrow B_0 \quad (3)$$

$$I_1 \rightarrow B_1 \quad (4)$$

$$I_2 \rightarrow B_2 \quad (5)$$

At step 204, a truth table is computed by using the processor's logic operations on the basis tables $B_0$, $B_1$, and $B_2$ to reflect the original logic equation.

For example, the "2 of 3 recognizer" could be implemented in the C programming language as follows:

typedef int table;

table b0=0xaa;

table b1=0xcc;

table b2=0xf0;

$$\text{table } d = (b0 \;\&\; b1 \;\&\; \sim b2) | (\sim b0 \;\&\; b1 \;\&\; b2) | (b0 \;\&\; \sim b1 \;\&\; b2) \quad (6)$$

Equation (6) exactly matches the original logic equation for the "2 of 3" recognizer with just a simple substitution of variables ($I_0 \rightarrow B_0$, $I_1 \rightarrow B_1$, and $I_2 \rightarrow B_2$). The result, d, contains the same truth table as in Table 1, but was accomplished much faster than the conventional method since evaluations on all the 8 bits of each basis tables $B_0$, $B_1$, and $B_2$ can be performed simultaneously. In contrast, the conventional method described earlier involves a bit-by-bit evaluation that is performed sequentially. In the case of a 64-bit processor, 64 evaluations can be performed simultaneously according to the present invention as opposed to the sequential bit-by-bit sequential evaluation in the conventional method.

Furthermore, the method according to the present invention is simple and inexpensive because it eliminates the need for allocating and interconnecting software data structures to represent the desired logic circuit which is required in the conventional method.

The method ends after step 204.

For another example, the following is an evaluation of Truth Tables with N inputs in accordance with the present invention, where $2^N$ is greater than the natural word width of a processor on which the algorithm is implemented.

In this situation, a new data type with larger widths can be introduced. For example, in C++, a templated class called TruthTable<int inputs> can be defined which implements all of the logical operations on arbitrary width tables.

An example of a partial implementation of the Truth Table class in C++ for a host processor with a natural word width of 32 bits is as follows:

```
template <int BITS>
class TruthTable {
    public:
        int* words;
}

// Construct a truth table
TruthTable( ) {
    //allocate memory for truth table
    words = new int[(BITS + 31)/32];
}
//"AND" two truth tables together
TruthTable operator& (TruthTable& other) {
    TruthTable*, result = new TruthTable( );
    const int wordCount = (BITS/31)/32;
    for (int i=0; i<wordCount; i++)
        result → words [t]=this → words[i] & other.words [i];
    return *result;
}
/* other logic functions coded in a similar manner*/
}
```

The following illustrates how the above truth table can be implemented for a "5 of 6" recognizer.

```
TruthTable <64> b0, b1, b2, b3, b4, b5;
//Initialize variables 60, . . . , 65 using equation (2)
TruthTable<64>d =   (b0 & b1 & b2 & b3 & b4 & ~b5)|
                    (b0 & b1 & b2 & b3 & ~b4 & b5)|
                    (b0 & b1 & b2 & ~b3 & b4 & b5)|
                    (b0 & b1 & ~b2 & b3 & b4 & b5)|
                    (b0 & ~b1 & b2 & b3 & b4 & b5)|
                    (~b0 & b1 & b2 & b3 & b4 & b5);
```

Accordingly, the present invention provides an improved method and system for computation of truth tables that is fast, simple and inexpensive.

While the best mode involves FPGAs, it should be understood that method of the present invention is applicable to other logic devices, which require the computation of truth tables.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hither-to-fore set forth herein or shown in the accompanying drawings are to be interpreted in an illustrative and non-limiting sense.

The invention claimed is:

1. A method of computing a truth table with N input variables, comprising:

providing N basis tables represented by $B_{ib} = \lfloor b/2^i \rfloor$ modulo 2:

where $\lfloor \; \rfloor$ is a floor function which rounds down its content to a nearest integer, i is an index of each of the N basis tables, i=0 to N−1, and b is a bit number in each of the N basis tables, b=0 to $2^N-1$;

associating, each one of the N basis tables with a corresponding one of the N input variables; and performing logic operations on the N basis tables using a processor.

2. The method as claimed in claim 1 wherein providing N basis tables provides N basis tables each having $2^N$ bits.

3. The method as claimed in claim 1 wherein providing N basis tables provides N basis tables each of which is represented by a single word of a memory coupled to the processor.

4. The method as claimed in claim 1 wherein performing logic operations on the N basis tables using a processor uses an M-bit processor, where $M \geq N$.

5. The method as claimed in claim 1 wherein performing logic operations on the N basis tables using a processor uses an M-bit processor, where $M < N$.

6. The method as claimed in claim 2 wherein performing logic operations on the N basis tables using a processor performs logic operations on each of the $2^N$ bits of each of the N basis tables simultaneously.

7. The method as claimed in claim 2 wherein performing logic operations on the N basis tables using a processor performs each of the logic operations on one of the $2^N$ bits from each of the N basis tables.

8. A method of computing a truth table with N input variables, comprising:
    providing N basis tables, each of the N basis tables having $2^N$ bits, the N basis tables represented by $B_{ib} = \lfloor b/2^i \rfloor$ modulo 2:
        where $\lfloor \ \rfloor$ is a floor function which rounds down its content to a nearest integer,
        i is an index of each of the N basis tables, i=0 to N−1, and
        b is a bit number in each of the N basis tables, b=0 to $2^N-1$;
    associating each one of the N basis tables with a corresponding one of the N input variables; and
    performing logic operations on the N basis tables using a processor, wherein each of logic operations is performed on one of the $2^N$ bits of each of the N basis tables.

9. The method as claimed in claim 8 wherein providing N basis tables provides N basis tables each of which is represented by a single word of a memory coupled to the processor.

10. The method as claimed in claim 8 wherein performing logic operations on the N basis tables using a processor uses an M-bit processor, where $M \geq N$.

11. The method as claimed in claim 8 wherein performing logic operations on the N basis tables using a processor uses an M-bit processor, where $M < N$.

12. The method as claimed in claim 9 wherein performing logic operations on the N basis tables using a processor performs logic operations on each of the $2^N$ bits of each of the N basis tables simultaneously.

13. A method of computing a truth table with N input variables, comprising:
    providing N basis tables, each of the N basis tables having $2^N$ bits and being represented by a single word of a memory coupled to a processor, wherein the N basis tables are represented by $B_{ib} = \lfloor b/2^i \rfloor$ modulo 2,
        where $\lfloor \ \rfloor$ is a floor function which rounds down its content to a nearest integer,
        i is an index of each of the N basis tables, i=0 to N−1, and
        b is a bit number in each of the N basis tables, b=0 to $2^N-1$;
    associating each one of the N basis tables with a corresponding one of the N input variables; and
    performing logic operations on the N basis tables using the processor, wherein:
        each of the logic operations is performed on one of the $2^N$ bits of each of the N basis tables, and
        each of the logic operations is performed on each of the $2^N$ bits of each of the N basis tables simultaneously.

14. The method as claimed in claim 13 wherein performing logic operations on the N basis tables using a processor uses an N-bit processor.

15. The method as claimed in claim 13 wherein performing logic operations on the N basis tables using a processor uses an M-bit processor, where $M \geq N$.

16. The method as claimed in claim 13, wherein performing logic operations on the N basis tables using a processor uses an M-bit processor, where $M < N$.

\* \* \* \* \*